United States Patent [19]

Shimotashiro et al.

[11] Patent Number: 5,321,557
[45] Date of Patent: Jun. 14, 1994

[54] MAGNETIC RECORDING AND REPRODUCING APPARATUS HAVING MULTIPLE MAGNETIC HEADS

[75] Inventors: Masafumi Shimotashiro, Neyagawa; Takeshi Inoue, Kadoma; Hiroshi Okamoto, Nara; Masaru Higashionji, Katano; Tetsuya Mizushima, Yawata; Tatsushi Bannai; Souichiro Fujioka, both of Sakai, all of Japan

[73] Assignee: Matsushita Electric Industrial Co., Ltd., Osaka, Japan

[21] Appl. No.: 715,590

[22] Filed: Jun. 14, 1991

[30] Foreign Application Priority Data

| Jun. 25, 1990 | [JP] | Japan | 2-167239 |
| Jul. 26, 1990 | [JP] | Japan | 2-200510 |
| Nov. 20, 1990 | [JP] | Japan | 2-317231 |
| Dec. 25, 1990 | [JP] | Japan | 2-405733 |
| Mar. 20, 1991 | [JP] | Japan | 3-056642 |

[51] Int. Cl.⁵ ............... H04N 5/78; G11B 5/035; G11B 5/584
[52] U.S. Cl. .................. 360/37.1; 360/65; 360/77.14
[58] Field of Search .......... 360/64, 77.13, 77.14, 360/77.16, 37.1, 65

[56] References Cited

U.S. PATENT DOCUMENTS

| 4,897,739 | 1/1990 | Hasegawa et al. | 360/64 |
| 4,942,487 | 7/1990 | Noguchi et al. | 360/77.13 |
| 4,972,272 | 11/1990 | Morioka et al. | 360/64 |
| 5,087,995 | 2/1992 | Nagasawa et al. | 360/77.14 |
| 5,124,853 | 6/1992 | Kashida et al. | 360/64 |
| 5,157,563 | 10/1992 | Nagasawa et al. | 360/77.16 |

OTHER PUBLICATIONS

A. Hirota, "8 mm Video about the Video Signal Recording," Technical Report of the Institute of Television Engineers of Japan, VR61-1, pp. 1-6, Feb. 1984.
VTR Technology, NHK, pp. 73-105, Oct. 1980.

Primary Examiner—Timothy P. Callahan
Assistant Examiner—Trong Phan
Attorney, Agent, or Firm—Stevens, Davis, Miller & Mosher

[57] ABSTRACT

A magnetic recording and reproducing apparatus for recording and reproducing a video digital signal suitable to a narrowed track pitch having two magnetic heads with the same azimuth angle arranged with an overlapped area to reproduce the same track, and a tracking servo executing phase control such that a center of a reproducing track is brought to a center of the overlapped area of the two magnetic heads. Reproduced signals of the two magnetic heads are compared so that the reproduced output of the magnetic head having a good on-track condition is always selected to improve a tracking margin without increasing crosstalk disturbance from adjacent track.

4 Claims, 12 Drawing Sheets

MAGNETIC RECORDING AND REPRODUCING APPARATUS HAVING MULTIPLE MAGNETIC HEADS

BACKGROUND OF THE INVENTION

1. Field of the Invention

The present invention relates to a magnetic recording and reproducing apparatus which records and reproduces digital signals (video signals and audio signals) and is useful for narrowing track pitches.

2. Description of the Related Art

A recording pattern in a prior art magnetic recording and reproducing apparatus, used in a home VTR or the like, is defined to record data without a guard band in order to increase recording density, and to conduct aximuth record in order to reduce cross-talk between adjacent tracks. The data is reproduced by a reproducing head having a wider head width than a track pitch, while taking deviation due to curvature of tracking into consideration.

Tracking errors are detected by recording a pulse, representing a rotation phase of a head drum, as a control signal in a control track of a magnetic tape. The control track is located along longitudinal direction of the magnetic tape, separately from a video track for recording a video signal. In a reproduction mode, by comparing a phase of the reproduced control signal from the control track with a phase of the rotation pulse of the head drum tracking error may be detected. (See, for example, VTR Technology, by R. Takahaski, NHK, Oct. 20, 1980.)

On the other hand, in 8 mm video technologies, four low frequency tracking pilots of different frequencies are generated, and one of them is azimuth-recorded for each video track by frequency-multiplexing them with the video signal without a guard band. In the reproduction mode, a reproducing head having a wider head width than the track pitch is used and two low frequency pilots recorded on the two adjacent video tracks are detected for inspection of cross-talk from the adjacent video tracks, and the amplitude levels of the two low frequency pilots are compared to detect tracking error. (For example, as disclosed in "8 mm Video (1)" by A. Hirota, Technical Report of the Institute of Television Engineers of Japan, VR61-1, pp. 1–6 Feb. 23, 1984)).

However, in a recent apparatus which converts a video signal to a digital signal and records and reproduces it on and from a magnetic tape, a reduction of the track pitch is intended in order to reduce the size and the weight of the apparatus and extend the recording time.

Accordingly, when the prior art apparatus is applied to such a narrow track pitch apparatus, the following problems arise.

For example, in the above two examples of the prior art, the magnetic head width Tw is usually designed to be approximately 1.5 Tp, where Tp is the track pitch. Accordingly, a tracking margin is usually 0.5 Tp. As Tp is narrowed, the absolute value of the tracking margin reduces. As a result, expansion of the tracking margin or improvement of the tracking precision is required.

Where Tw is set to 2Tp to give a greater tracking margin, the tracking margin is expanded, but the magnetic head width which crosses the adjacent tracks increases. As a result, when the data is azimuth recorded and reproduced in the above two examples of the prior art, a disturbance signal from adjacent crosstalk increases and a higher signal-to-noise ratio (S/N) is required.

Where interoperable reproduction between apparatus having a very large track curvature is required, a variation of the tracking error increases and there is a risk that a next track to the adjacent track on which data has been azimuth-recorded may be reproduced. In this case, an azimuth loss may not be expected, and a disturbance signal by the cross-talk of the next track to the adjacent track increases and a further higher S/N is required.

Accordingly, it is not possible to widen the magnetic head width more than an appropriate width, and the tracking margin cannot be simply expanded.

In a tracking error detector which uses the prior art control track, the control reference signal is recorded on a control track, which is different from the video track. Accordingly, the linearity (curvature) of the video track cannot be detected and it is very difficult to improve the detection precision of the tracking error.

SUMMARY OF THE INVENTION

In the light of the above, it is an object of the present invention to provide a magnetic recording and reproducing apparatus which has strong resistance against an adjacent crosstalk disturbance signal or a second adjacent crosstalk disturbance signal which poses a problem when the track pitch is narrowed, or a magnetic recording and reproducing apparatus which has strong resistance against a track curvature and has a large tracking margin, or a magnetic recording and reproducing apparatus which has a high tracking control precision.

A first embodiment of the present invention comprises two multi-structure magnetic heads having the same azimuth angle for reproducing one track with a overlap of one track pitch, a comparator for comparing the numbers of errors of digital signals reproduced by the two magnetic heads, and a selector for selecting one of the two reproduced output signals in accordance with an output of the comparator. The comparator detects the output signal of the magnetic head having a smaller number of errors of the reproduced digital signal, and the selector selects the output signal of the magnetic head having the smaller number of errors in accordance with the output of the comparator.

A tracking error is detected by a tracking error detector which compares amplitude levels of the two reproduced digital signal outputs from the two magnetic heads for detecting a tracking error signal.

By selecting one of the reproduced outputs of the two multi-structure magnetic heads, a tracking margin can be expanded up to Tp where Tp is a track pitch and a head width Tw of each magnetic head is 1.5 Tp. Since the head width of each magnetic head remains Tw = 1.5 Tp, the disturbance by the adjacent crosstalk does not increase by the expansion of the tracking margin and disturbance by the second adjacent crosstalk is unlikely to occur.

Further, since the signal recorded on one track is used to detect the tracking error signal, the detection is not affected by the level variation in recording and the accuracy of the tracking error detection is improved.

A second embodiment of the present invention comprises two multi-structure magnetic heads having the same azimuth angle for reproducing one track with an overlap of one track pitch, a delay circuit for correcting time axis errors of the digital signals reproduced by the two magnetic heads, a comparator for comparing the output levels of the reproduced digital signals having the time axis errors thereof corrected, a selector for selecting one of the two reproduced output signals in accordance with an output of the comparator, and a synchronous detector for detecting a selection timing of the selector based on an output of the selector.

The tracking error is detected by a tracking error detector which compares amplitudes of the two reproduced digital signal outputs having the time axis errors thereof corrected to detect a tracking error signal.

Like the first embodiment, the second embodiment selects one of the reproduced outputs of the two multi-structure magnetic heads. Accordingly, the tracking margin can be expanded without increasing the disturbance by the adjacent crosstalk and without substantial disturbance by the second adjacent crosstalk, and the accuracy of the tracking error detection is improved.

In the second embodiment, since the time axis errors of the reproduced digital signals are corrected and the output levels of the reproduced signals are compared for selection, an analog circuit may be used for implementation and a circuit scale can be reduced.

A third embodiment of the present invention comprises two multi-structure magnetic heads having the same azimuth angle for reproducing one track with an overlap of one track pitch, a delay circuit for correcting time axis errors of digital signals reproduced by the two magnetic heads, and a signal adder for adding the two reproduced digital signals having the time axis errors thereof corrected. Like the second embodiment, the tracking error is detected by a tracking error detector which compares amplitudes of the two reproduced digital signal outputs of the two magnetic heads having corrected on the same time axis to detect a tracking error signal.

In the third embodiment, since the two reproduced digital signals having the time axis errors thereof corrected are added by the signal adder, a main signal which is reproduced by overlapping is doubled, and a signal reproduced without overlap, primarily a noise component including the adjacent crosstalk is multiplied by a factor of $\sqrt{2}$. Accordingly, the affect by the disturbance by the adjacent crosstalk is relieved. Further, since the magnetic heads are arranged in the same manner as that of the first embodiment, the tracking margin is expanded.

A fourth embodiment of the present invention is a magnetic recording and reproducing head for recording signals on oblique tracks on a magnetic tape of magnetic heads which comprises two magnetic heads having a head-to-head interval different from a recording track pitch for reproducing signals from two different tracks substantially simultaneously, a tracking error detector for detecting a tracking error from a difference between levels of the reproduced output signals of the two magnetic heads, and a tracking servo for controlling the tracking in accordance with the tracking error. Since the interval of the magnetic heads is different from the recording track width, phases of variations of the signal levels reproduced by the two magnetic heads relative to the tracking error are different. Accordingly, the tracking error can be defined. Therefore, the tracking error including the linearity of the recording track can be detected, and the accuracy of the tracking error detection is improved without increasing the number of magnetic heads relative to the number of tracks.

DESCRIPTION OF THE PREFERRED EMBODIMENTS

The embodiments of the present invention are now explained with reference to the drawings.

Figure 1:
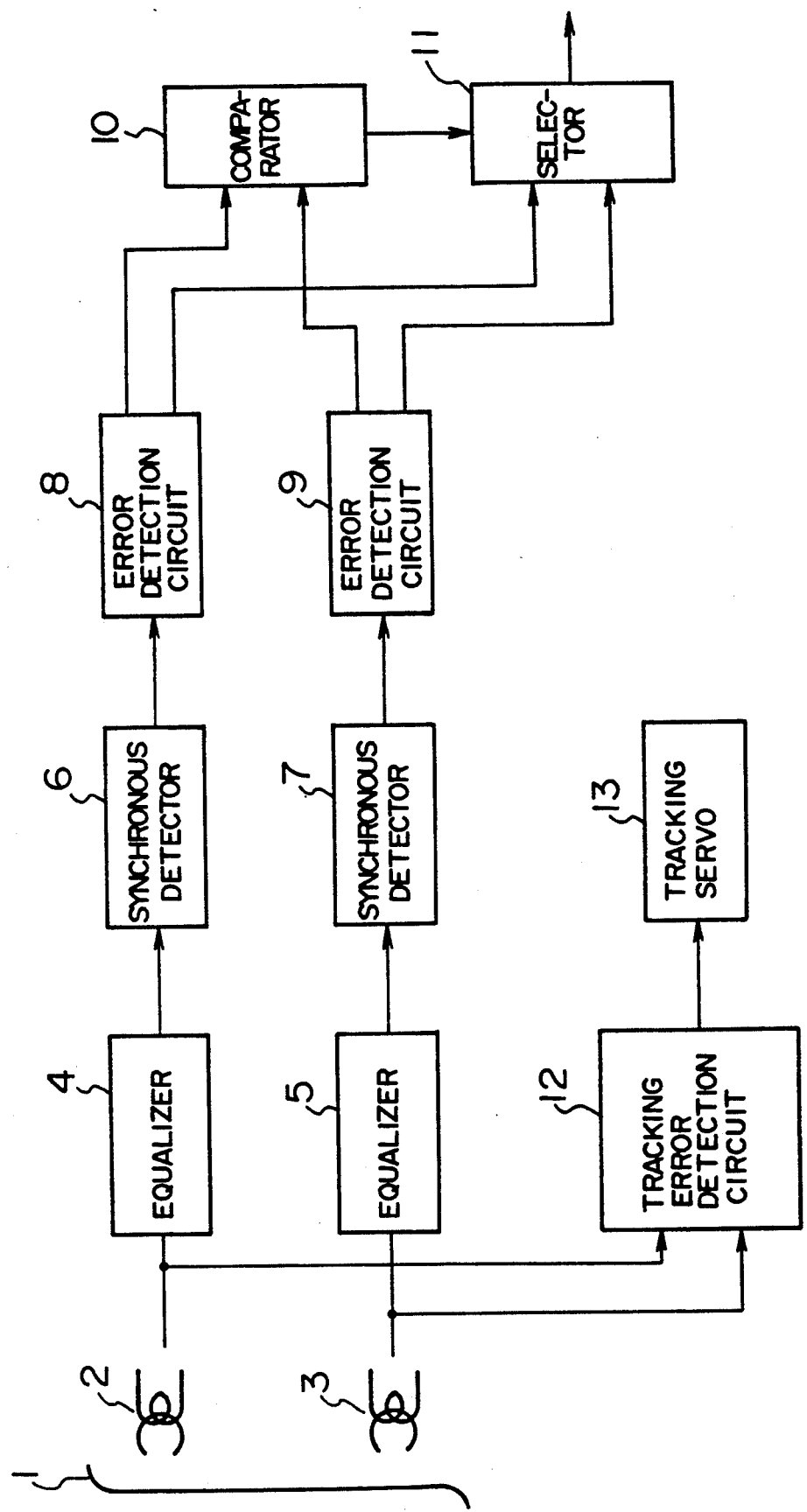
FIG. 1 shows a block diagram of a principal portion of a first embodiment of a magnetic recording and reproducing apparatus of the present invention.

FIG. 1 shows a block diagram of a principal portion of a first embodiment of the magnetic recording and reproducing apparatus of the present invention.

Figure 2:
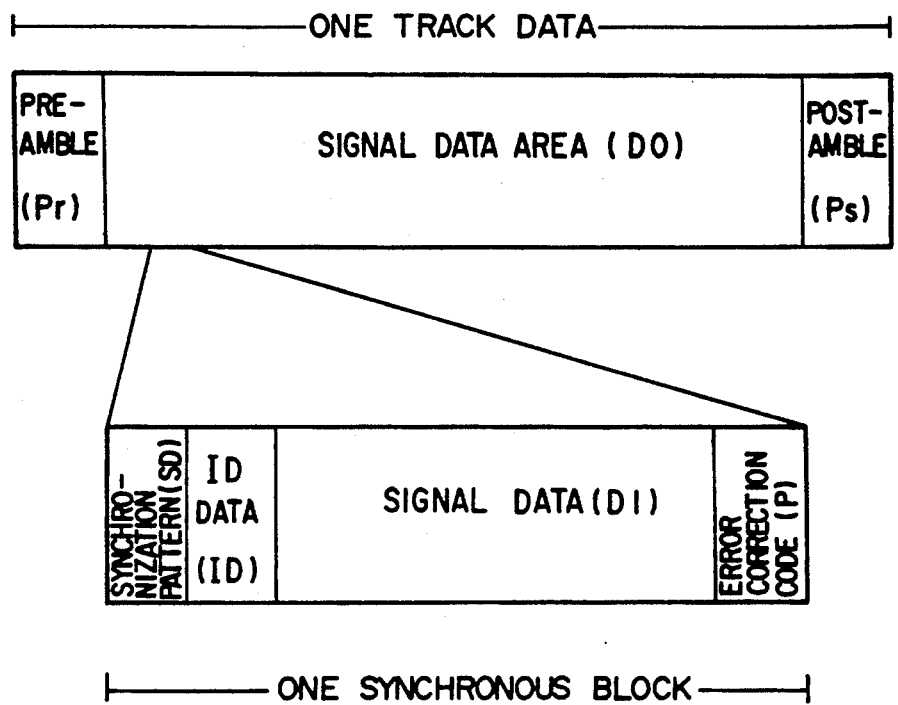
FIG. 2 shows a data format of recorded data of a digital signal in the first embodiment of the present invention.

Numeral 1 denotes a magnetic tape on which signals are recorded. As shown in FIG. 2, one-track data of the signal recorded on the magnetic tape 1 comprises a preamble (Pr), a signal data area (D0) and a post-amble (Ps). The signal data area (D0) comprises at least one synchronous block which includes a synchronous pattern (SD) indicating a bit reference, ID data (ID) indicating a data position, signal data (such as a video signal) (D1) and an error correction code (P) (such as a code generated by a Reed-Solomon coding algorithm).

Figure 3:
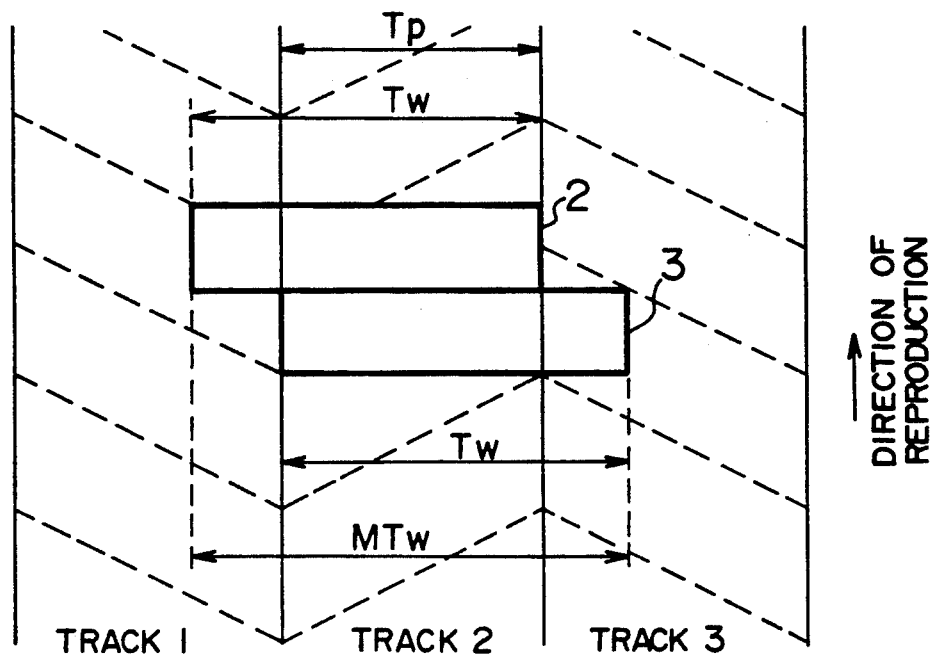
FIG. 3 shows an arrangement of record tracks on a magnetic tape and multi-structure magnetic heads in the first embodiment of the present invention.

Returning to FIG. 1, numerals 2 and 3 denote two multi-structure magnetic heads for reproducing the signals recorded on the magnetic tape 1. FIG. 3 shows an arrangement of record tracks on the magnetic tape 1 and the multi-structure magnetic heads 2 and 3. A head width Tw of the magnetic heads 2 and 3 is larger than a record track width Tp, and an overlap of the magnetic heads is equal to the record track pitch Tp. The magnetic heads 2 and 3 have the same azimuth angle (in FIG. 3, they have the same azimuth angle as that of a track and the reverse azimuth with respect to tracks 1 and 3) and are arranged to reproduce one record track (track 2 in FIG. 3) with an overlap.

In FIG. 1, signals reproduced by the magnetic heads 2 and 3 are supplied to equalizers 4 and 5 and a tracking error detector 12. Each of the equalizers and 5 comprises a cosine equalizer and a PLL circuit, and corrects a frequency characteristic of the reproduced signal, generates a reproducing clock and supplies it to a synchronous detector 6 or 7.

Each of the synchronous detectors 6 and 7 detects the synchronous pattern SD to reproduce word synchronization, converts it to a standard 8-bit word data, detects address information from the ID data and sends them to an error detector 8 or 9 at a minimum unit of one synchronous block.

Each of the error detectors 8 and 9 calculates the number of errors from an error correction code for each synchronous block which is the minimum unit, supplies it to a comparator 10 and supplies a digital decoded digital signal to a selector 11.

The comparator 10 compares the numbers of errors of synchronous blocks having the same ID address and supplies the comparison result to the selector 11. The selector 11 selects the synchronous block having a smaller number of errors in accordance with the output signal of the comparator 10 for each synchronous block.

The tracking error detector 12 compares amplitude levels of principal signals of the reproduced signals of the multi-structure magnetic heads 2 and 3, that is, the amplitude levels of the signals reproduced from the track 2 of FIG. 3, and supplies an amplitude level difference to a tracking servo 13 as a tracking error signal.

Assuming that detracking occurs in FIG. 3 so that a head position is shifted to the right by a small distance with respect to the record track, an area of the track 2 which is reproduced by the magnetic head 2 does not change, but an area of the track 2 which is reproduced by the magnetic head 3 changes. Namely, the amplitude level of the reproduced output of the magnetic head 3 is lower than that of the magnetic head 2. The amplitude level difference is detected as the tracking error and the tracking servo 13 controls to render the tracking error to zero, that is, to move the head leftward.

Conversely, when the head position is shifted leftward by a small distance with respect to the record track, the area of the track 2 which is reproduced by the magnetic head 3 does not change but the area of the track 2 which is reproduced by the magnetic head 2 changes. In a similar manner, the tracking servo 13 controls to move the head rightward.

In this manner, the tracking error is detected and the tracking servo controls the phase so that the track 2 is traced by the center of the multi-structure magnetic heads 1 and 2 shown in FIG. 3.

In the present embodiment, since the reproduced signal of the magnetic head having the smaller number of errors is selected, the reproduced signal of the magnetic head which has good on-track condition can be always selected. In the arrangement of the magnetic heads shown in FIG. 3, a total magnetic head width is equivalent to MTw and the tracking margin is improved.

As shown in FIG. 3, the head width Tw of each of the magnetic heads may usually be equal to that in the reproduction mode, and even if the tracking margin is expanded as described above, the disturbance signal by the adjacent crosstalk is equal to that in the prior art and it is not necessary to increase the S/N required to detect the reproduced digital signal.

Even if the tracking error increases and the magnetic heads reproduce the second adjacent track having data recorded at the same azimuth, only one magnetic head reproduces the second adjacent track because of the arrangement of the magnetic heads as shown in FIG. 3. Thus, since the reproduced output of the other magnetic head does not reproduce the second adjacent track, the crosstalk disturbance from the second adjacent track can be eliminated.

Further, since the output amplitudes of the reproduced outputs from the same track are detected, the affect by the amplitude variation in the recording mode is eliminated and the accuracy of detecting the tracking error can be improved. Further, since the tracking error is detected from the video track under reproduction, the tracking error including the linearity (tracking curvature) of the video track can be detected and more accurate tracking error detection is attained.

As a modification 1—1 of the first embodiment of the present invention, a configuration to completely eliminate the adjacent crosstalk disturbance is explained. The modification 1—1 of the magnetic recording and reproducing apparatus has the same configuration as that of the first embodiment shown in FIG. 1 except that the structure of the magnetic heads, which is explained below.

Figure 4:
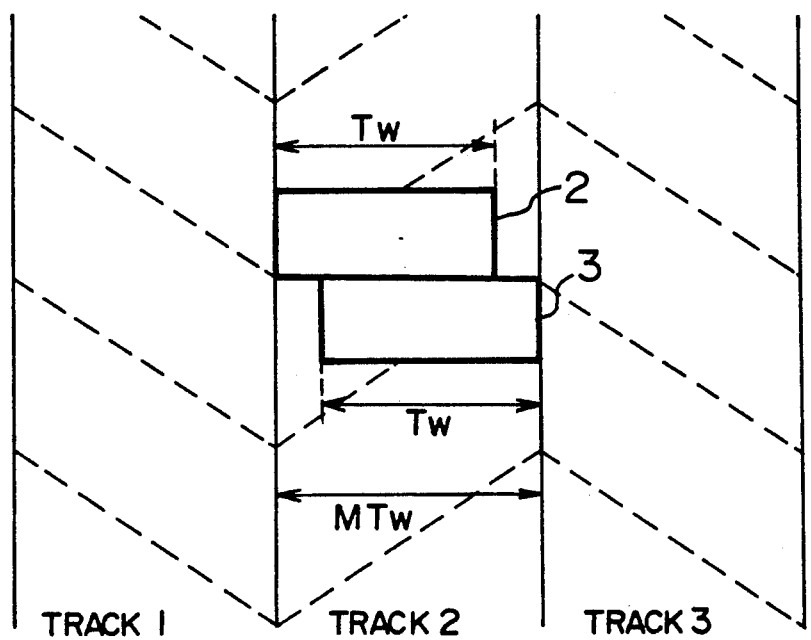
FIG. 4 shows an arrangement of the tracks on the magnetic tape and the multi-structure magnetic heads where a head width of the magnetic heads in the first embodiment of the present invention is smaller than a track pitch.

FIG. 4 shows an arrangement of record tracks and the multi-structure magnetic heads of the modification 1—1. The head width of each of the multi-structure magnetic heads 2 and 3 is smaller than the record track width, and the magnetic heads 2 and 3 are arranged such that the double of the head width less the overlap of the magnetic heads is equal to the record track pitch. Accordingly, even if the tracking deviates slightly, either the magnetic head 2 or 3 is in the on-track state in the record track. For example, when the tracking error occurs in FIG. 4 so that the head is shifted to the right by a small distance with respect to the record track, the magnetic head 2 is totally included in the record track and the area of the track 2 which is reproduced by the magnetic head 2 does not change, but the area of the track 2 which is reproduced by the magnetic head 3 decreases. In this case, the number of errors of the reproduced output of the magnetic head 3 is larger than that of the magnetic head 2. Accordingly the selector 11 selects the output signal of the error detection circuit 8 for the reproduced output of the magnetic head 2. Similarly, when the head is shifted to the left by a small distance with respect to the record track, the selector 11 selects the output signal of the error detection circuit 9 for the reproduced output of the magnetic head 3. Thus, in accordance with the magnetic head structure shown in FIG. 4, the reproduced signal is produced free from the crosstalk disturbance signal from the adjacent track.

As a modification 1-2 of the first embodiment of the present invention, the frequency multiplication of the tracking pilot signal in a low frequency band is explained.

The modification 1-2 uses a tracking error detection circuit with an additional components to the first embodiment. In the modification 1-2, the primary signal of the recorded signal is frequency-multiplexed with low frequency tracking pilot signals on a digital signals comprising a synchronous block as a minimum unit which consists of a synchronous pattern, ID data, signal data and an error correction code as shown in FIG. 2.

Figure 5:
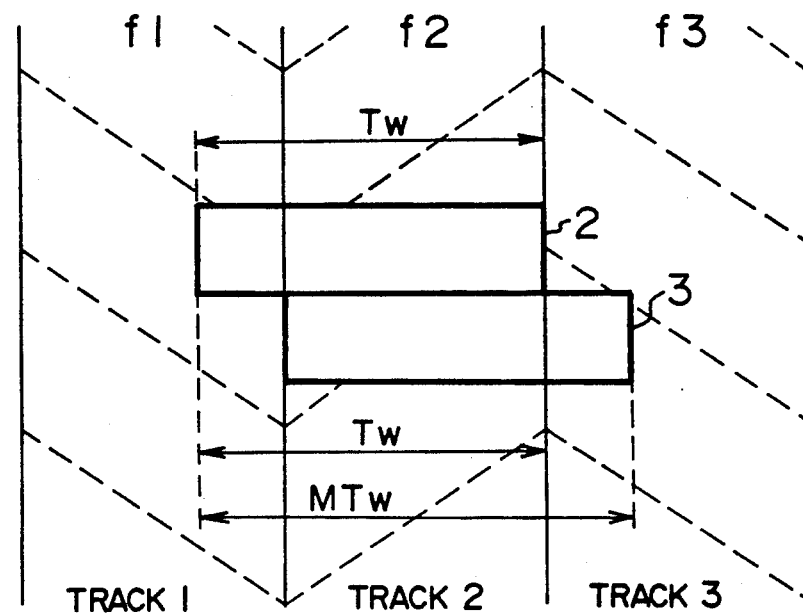
FIG. 5 shows an arrangement of the record tracks on the magnetic tape, the multi-structure magnetic heads and tracking pilot signals in the first embodiment of the present invention.

FIG. 5 shows an arrangement of record tracks on the magnetic tape 1 and the multi-structure magnetic heads 2 and 3. Tracking pilot signals (f1, f2 and f3 in FIG. 5, which are continuous signals of single frequency and have different frequencies from each other) and primary signals are recorded on the tracks 1, 2 and 3. The multi-structure magnetic heads 2 and 3 have the same azimuth angle as that of the track 2 (but they have reverse azimuth angle to those of the track 1 and 3 in FIG. 5) and they are arranged to reproduce the track 2 with an overlap.

Figure 6:
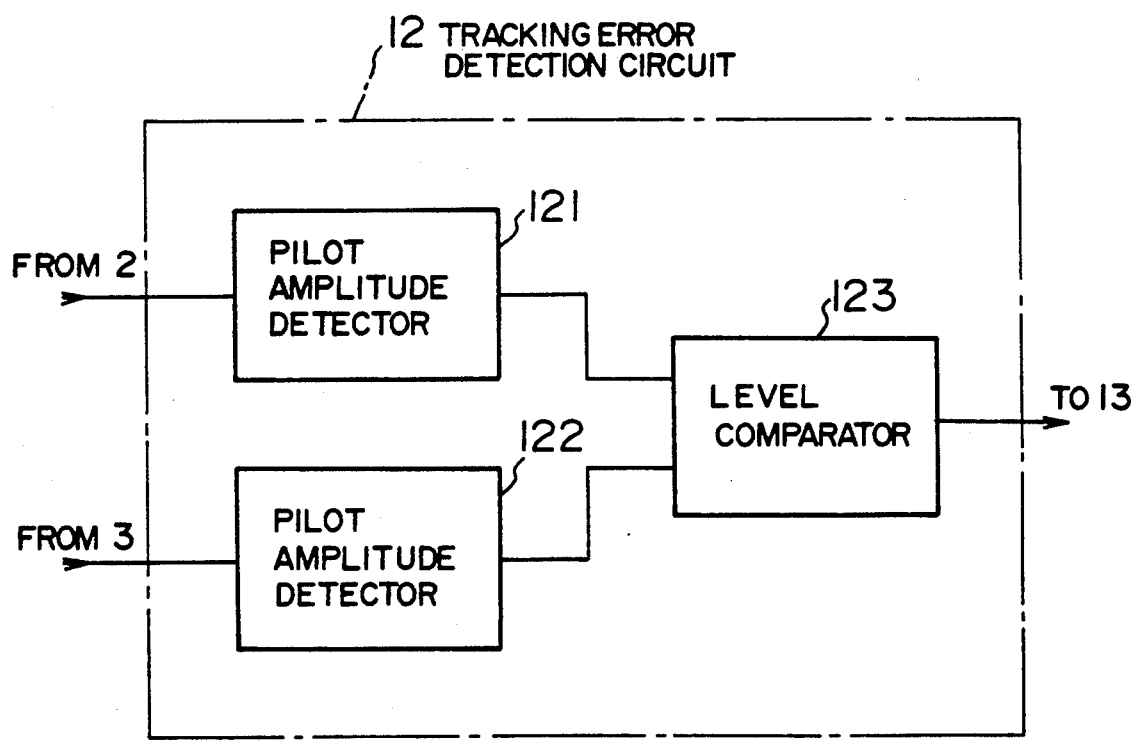
FIG. 6 shows a configuration of tracking error detection when the tracking pilot signals in the first embodiment of the present invention are used.

FIG. 6 shows a configuration of the tracking error detection circuit 12 in the modification 1-2. The magnetic head 2 reproduces f2 have the principal signal track as the tracking pilot and reproduces f1 as the adjacent crosstalk. Similarly, the magnetic head 3 reproduces f2 and f3.

A pilot amplitude detector 121 limits a band for the tracking pilot signal (f2) reproduced from the magnetic head 2, detects an amplitude level of f2 reproduced from the principal signal track 2, and supplies it to a level comparator 123.

A pilot amplitude detector 122 limits a band for the tracking pilot signal (f2) reproduced by the magnetic head 3, detects an amplitude level of the reproduced tracking pilot signal (f2) and supplies it to the level comparator 123.

The level comparator 123 compares the output levels of the pilot amplitude detectors 121 and 122 to detect a tracking error signal.

In the modification 1-2, since the tracking error is detected by using the tracking pilot signals recorded on the record tracks, the tracking error including the linearity of the record track (track curvature) can be detected. Further, since the pilot signals of single frequency are detected, the band limitation can be made by the pilot amplitude detectors 121 and 122. Thus, the S/N for the tracking error detection is improved. In addition, since the pilot signals recorded on the same track are used, the affect by the level variation of the pilot signals between the tracks is eliminated and the accuracy of detecting the tracking error is improved.

In a modification 1-3 of the first embodiment of the present invention, the tracking pilot signal is reproduced as an adjacent crosstalk from the adjacent track in order to detect the tracking error.

A block diagram of a principal portion of the modification 1-3 is identical to that of the modification 1-2 except that, in the tracking error detection circuit 12 shown in FIG. 6, the pilot amplitude detector 121 limits a band for the tracking pilot signal (f1) reproduced by the magnetic head 2 as the adjacent crosstalk, detects an amplitude level of the tracking pilot signal (f1) and supplies it to the level comparator 123.

Similarly, the pilot amplitude detector 122 detects the amplitude level of the tracking pilot signal (f3) reproduced by the magnetic head 3 as the adjacent crosstalk and supplies it to the level comparator 123.

The level comparator 123 compares the amplitude levels of the outputs of the pilot amplitude detectors 121 and 122 to produce the tracking error signal.

In the modification 1-3, since the multi-structure magnetic heads 2 and 3 are arranged as shown in FIG. 5, the reproduction width of the adjacent track reproduced by each of the magnetic heads is expanded compared to the prior art where one magnetic head is used. For example, in the prior art, assuming that the head width of the magnetic head is 1.5 Tp, the reproduction width for one side adjacent track under an ideal condition with the tracking servo (the center of the magnetic head is on the center of the track pitch of the reproducing track) is 0.25 Tp (where Tp is the track pitch). In the modification 1-3, assuming that the magnetic head width is same as the above and under the ideal condition with the tracking servo, the reproduction width is 0.5 Tp. Accordingly, the output level of the tracking pilot signal rises and dynamic range can be expanded.

In a modification 1-4 of the first embodiment of the present invention, the tracking error is detected by preventing the reproduction of the reverse azimuth by using the tracking pilot signal.

Figure 7:
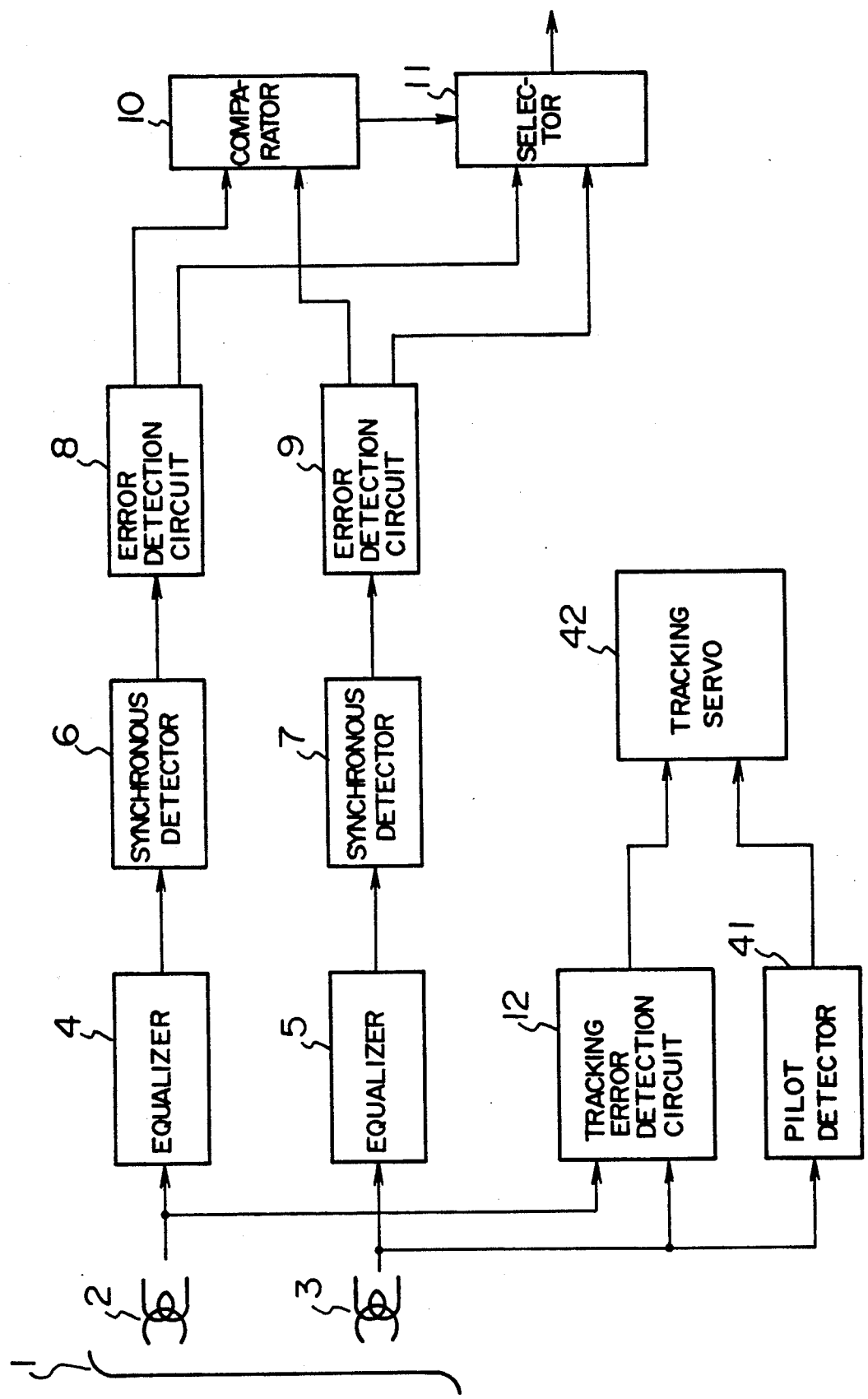
FIG. 7 shows a configuration of the tracking error detection when the tracking pilot signals in the first embodiment of the present invention and a signal amplitude are used.

FIG. 7 shows a block diagram of a principal portion of the magnetic recording and reproducing apparatus in the modification 1-4. The like elements to those shown in the first embodiment of the present invention are designated by the like numerals.

The magnetic tape 1 and the multi-structure magnetic heads 2 and 3 are identical to those shown in FIG. 5, and the magnetic heads 2 and 3 have the same azimuth angle and are arranged to reproduce the same record track with an overlap. The signals recorded on the magnetic tape 1 are digital signals having the tracking pilot signals added thereto.

The tracking error detector 12 has the same configuration as that of the first embodiment, and compares the amplitude levels of the principal signals reproduced by the magnetic heads 2 and 3 (the signals reproduced from the track 2 of FIG. 5) and supplies an amplitude level difference to a tracking servo 42 as the tracking error signal. The tracking error servo 42 executes the tracking control such that the tracking error is rendered to zero.

However, in the tracking error detection circuit 12 described above, where signals are azimuth-recorded at different azimuth angle for each record track, the reproduced amplitude level difference is zero even if the reverse azimuth track is reproduced. Therefore, the tracking control may be executed to trace the reverse azimuth track (reverse azimuth reproduction).

In the modification 1-4, a pilot detector 42 shown in FIG. 7 is added. The signal reproduced by the magnetic head 3 is applied to a pilot detector 41, which detects the tracking pilot signal added to the digital signal to determine whether a proper track is being reproduced or an improper track is being reproduced. If the proper track is not being reproduced, a control signal is sent from the pilot detector 41 to the tracking servo 42 which drives the multi-structure magnetic heads 2 and 3 by one track. In this manner, the reproduction of the reverse azimuth track is prevented and correct tracking is attained.

Figure 8:
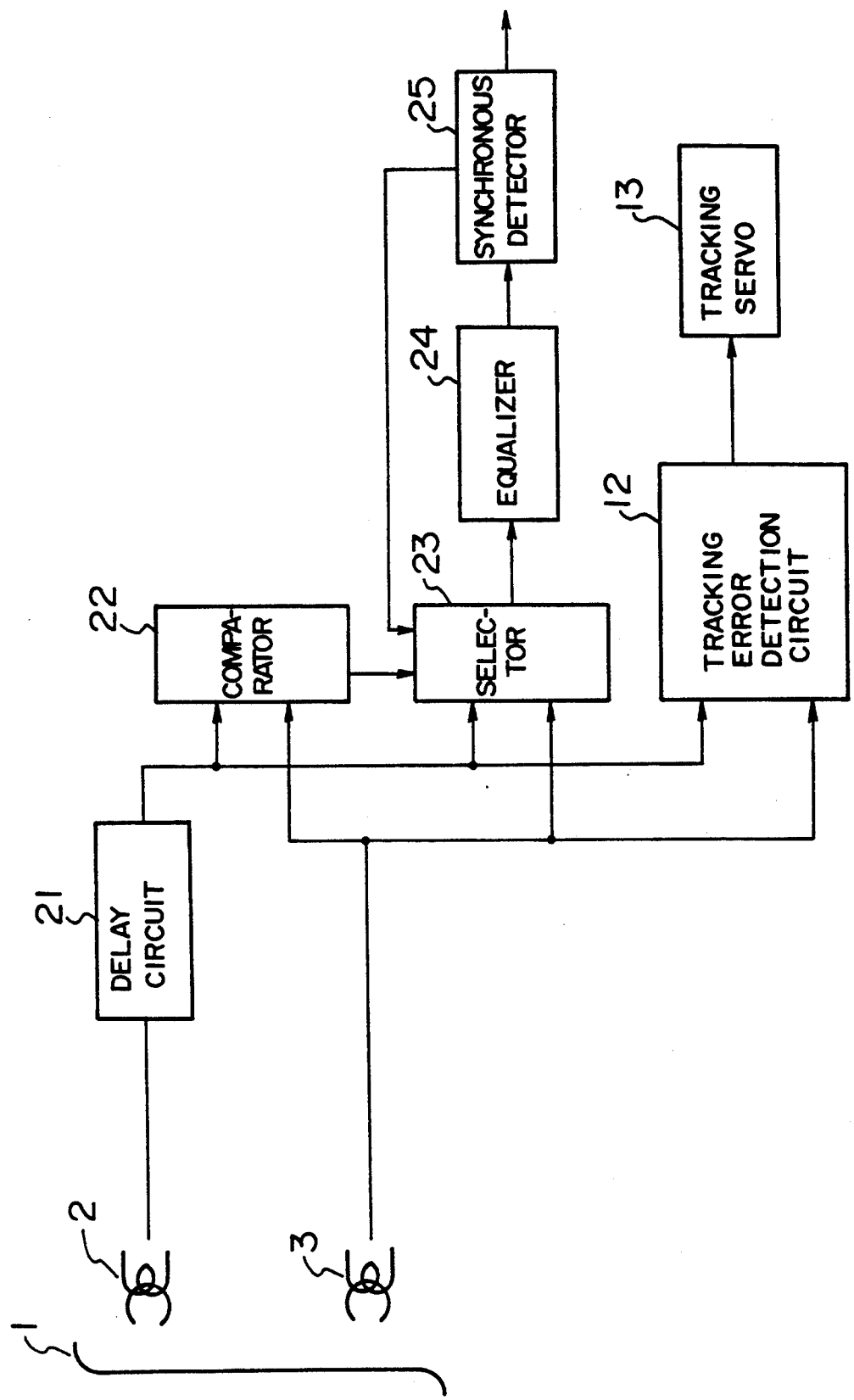
FIG. 8 shows a block diagram of a principal portion of a second embodiment of the magnetic recording and reproducing apparatus of the present invention.

FIG. 8 shows a block diagram of a principal portion of a second embodiment of the magnetic recording and reproducing apparatus of the present invention. The like elements to those of the first embodiment of the present invention are designated by the like numerals.

Figure 9:
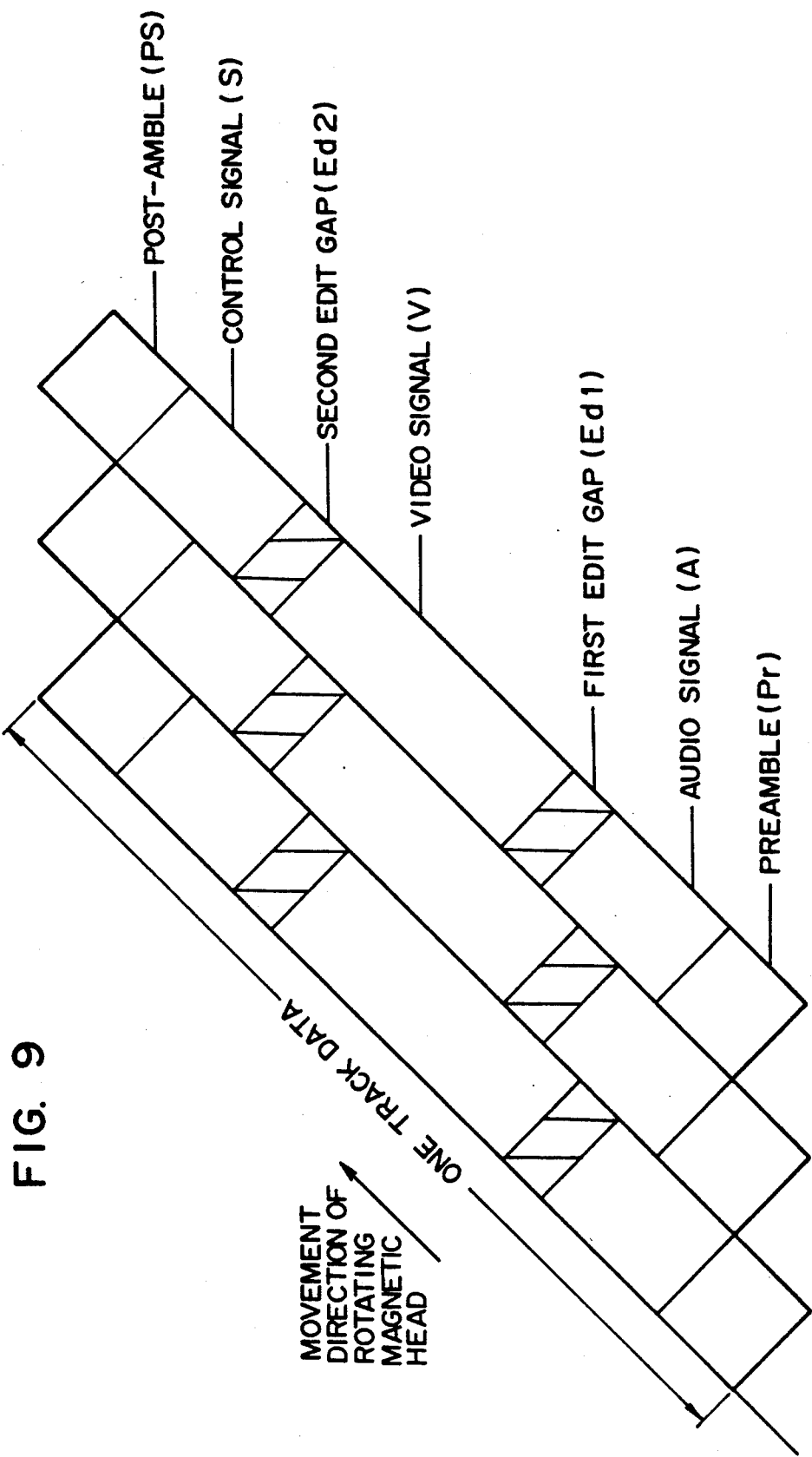
FIG. 9 shows a data format of a recorded signal in the second embodiment of the present invention.

The magnetic tape 1 and the multi-structure magnetic heads 2 and 3 are arranged as shown in FIG. 3. A record format of the magnetic tape 1 is shown in FIG. 9. Signals recorded in one track comprises a preamble (Pr), digital signal data (including an audio signal (A), a video signal (V) and a control signal (S) indicating VISS and VASS, and a minimum unit is one synchronous block as shown in FIG. 2) and a post-amble (Ps). A first edit gap (Ed 1) and a second edit gap (Ed 2) are provided at boundaries of data.

Since the direction of reproduction of the magnetic heads 2 and 3 is from the bottom to the top and the magnetic heads 2 and 3 are arranged as shown in FIG. 3, the magnetic head 2 reproduces the signal faster than the magnetic head 3 does when the signal at the same position on the tape is to be reproduced. Namely, the time axis of the reproduced signal of the magnetic head 2 is not equal to that of the magnetic head 3. Accordingly, a delay circuit 21 delays the reproduced signal of the magnetic head 2 to correct the time axes of the reproduced signals of the multi-structure magnetic heads 2 and 3 into the same time axis.

A comparator 22 compares the output amplitude level of the delay circuit 21 and the output amplitude level of the magnetic head 3 to compare the reproduced levels and supplies a comparison output to a selector 23, which selects a larger one of the output of the delay circuit 21 and the output of the magnetic head 3 in accordance with the output of the comparator 22.

The switching of the signals is carried out at the first edit gap (Ed 1) or the second edit gap (Ed 2). The timing of the first edit gap and the second edit gap is determined by a timing signal generated from the synchronous signal detected by the synchronous detector 25 and the address information of the ID data. An equalizer 24 comprises a cosine equalizer and a PLL circuit as it does in the first embodiment and corrects the frequency characteristic of the output of the selector 23 and a reproducing clock, which are supplied to the synchronous detector 25. The synchronous detector 25 detects a synchronization pattern to reproduce the word synchronization, converts it to a normal 8-bit word data, detects the address information from the ID data, generates the first and second edit gap timing, supplies it to the signal selector 23, and supplies the reproduced digital signal to the succeeding block.

The tracking error detector 12 compares the amplitude level of the output signal of the delay circuit 21 and the amplitude level of the signal reproduced from the magnetic head 3 to detect the tracking error and supplies it to the tracking servo 13, as it does in the first embodiment.

The tracking servo 13 executes the tracking control in accordance with the output signal of the tracking error detection circuit 12 to attain the correct tracing of the magnetic heads 2 and 3 shown in FIG. 3.

In the second embodiment of the present invention, the same effect as that of the first embodiment is attained although the chance of signal selection is lower. Compared to the first embodiment, the signal selection may be made in an analog area of the reproduced signal. As a result, the delay circuit 21, the comparator 22 and the signal selector 23 may be implemented by analog circuits and the circuit scale can be reduced.

The reduction of the chance of the signal selection is not significant because of the fact that the track curvature is substantially linear (characteristic of a semi-elliptic curve). Like the first embodiment, the second embodiment is not essentially affected by the adjacent crosstalk, can increase the total head width MT of the magnetic heads and expand the tracking margin.

Figure 10:
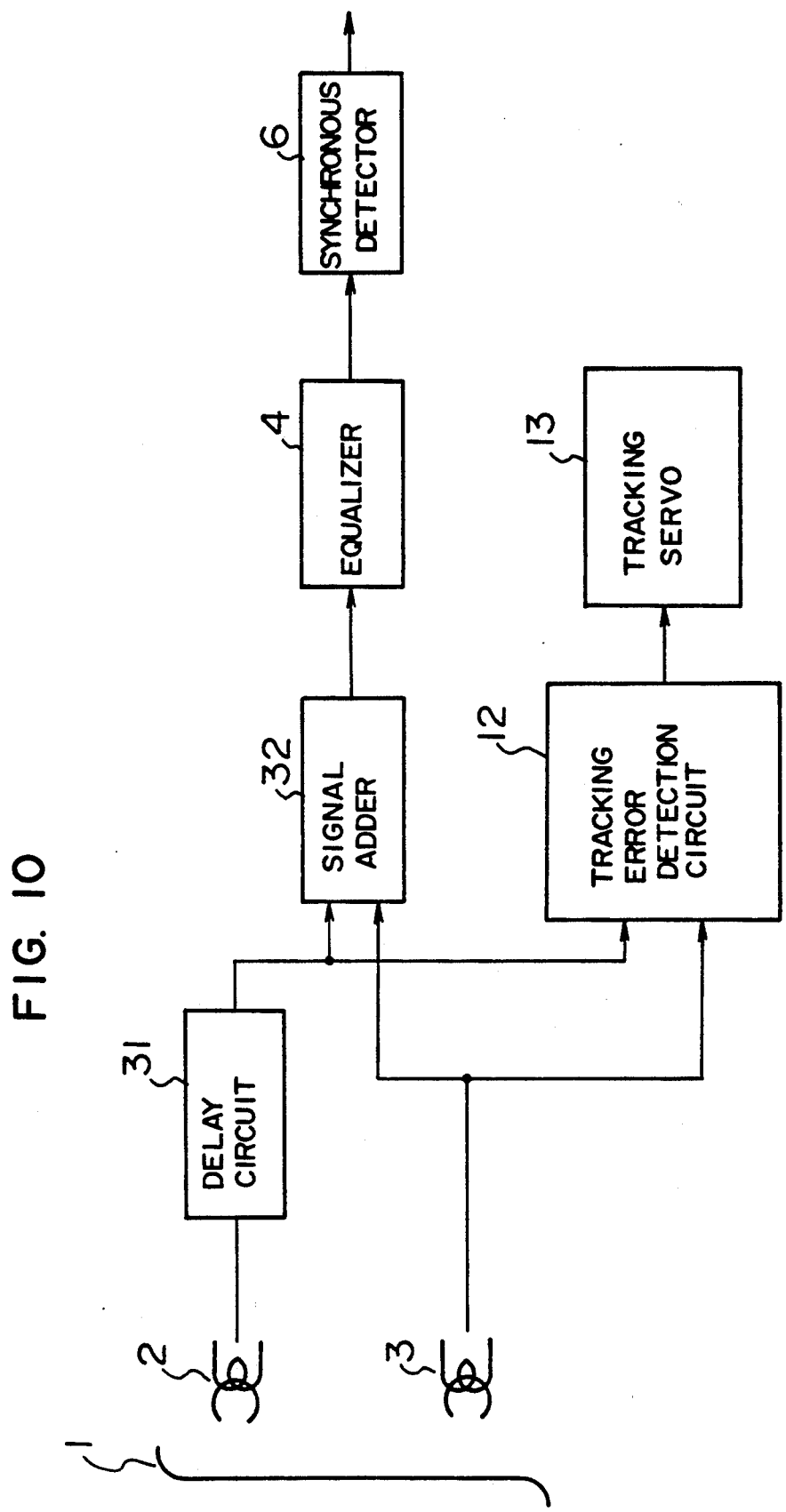
FIG. 10 shows a block diagram of a third embodiment of the present invention.

FIG. 10 shows a block diagram of a principal portion of the third embodiment of the magnetic recording and reproducing apparatus of the present invention. The like elements to those of the first embodiment are designated by the like numerals.

The magnetic tape 1 and the multi-structure magnetic heads 2 and 3 are arranged as shown in FIG. 5, and the digital signal recorded on the magnetic tape 1 has the record format of the data format shown in FIG. 2 and low frequency tracking pilot signals are frequency-multiplexed thereto.

A delay circuit 31 delays the reproduced signal of the magnetic head 2 to correct the time axes of the reproduced signals of the multi-structure magnetic heads 2 and 3 into the same time axis.

A signal adder 32 adds the output of the delay circuit 31 and the output of the magnetic head 3, which have the equal time axis, and supplies a sum output to the equalizer 4.

The equalizer 4 has the same configuration as that of the first embodiment, and supplies the output of the signal adder 32 having the frequency characteristic thereof corrected and a reproducing clock to the synchronous detector 6. The synchronous detector 6 is of the same configuration as that of the first embodiment, and decodes the digital signal, reproduces the word synchronization from the synchronization pattern, generates 8-bit word data, detects the address information from the ID data and supplies it to a succeeding block.

The tracking error detector 12 is of the same configuration as that shown in FIG. 6. The pilot amplitude detector 121 limits a band for the tracking pilot signal (f2) reproduced by the magnetic head 2, detects the amplitude level of the tracking pilot signal (f1) and supplies it to the level comparator 123.

Similarly, the pilot amplitude detector 122 limits a band for the tracking pilot signal (f2) reproduced by the magnetic head 3, detects the amplitude level of the tracking pilot signal (f2) and supplies it to the level comparator 123. The level comparator 123 compares the output levels of the pilot amplitude detectors 121 and 122 and supplies the tracking error signal to the tracking servo 13.

The tracking servo 13 executes the tracking control in accordance with the output signal of the tracking error detection circuit 12 to attain the correct tracing of the magnetic heads 2 and 3 shown in FIG. 5.

In the present embodiment, since the output of the delay circuit 31 and the output of the magnetic head 3, which are corrected for the time axis, are added by the signal adder 32, the signal level of the signals reproduced from the primary signal track is doubled by the addition, while the disturbance signal of the adjacent crosstalk reproduced from the adjacent track is multiplied by a factor of $\sqrt{2}$ by the addition of the components reproduced from the separate tracks. Accordingly, S/N is improved. Further, the random noise generated in the reproduction process of the magnetic heads 2 and 3 is also multiplied by the factor of °2 by the factor of $\sqrt{2}$ by the addition. Thus, S/N is further improved.

Further, because of the arrangement of the multi-structure magnetic head shown in FIG. 5, the total magnetic head width is equal to MTw. As a result, the tracking margin is expanded, the affect by the disturbance signals of the adjacent crosstalk and the second adjacent crosstalk is relieved by the signal addition so that the reduction of the track pitch is enhanced.

A modification 3-1 of the third embodiment of the present invention which detects the tracking error from the output signal of the signal adder by using the tracking pilot signal is now explained.

Figure 11:
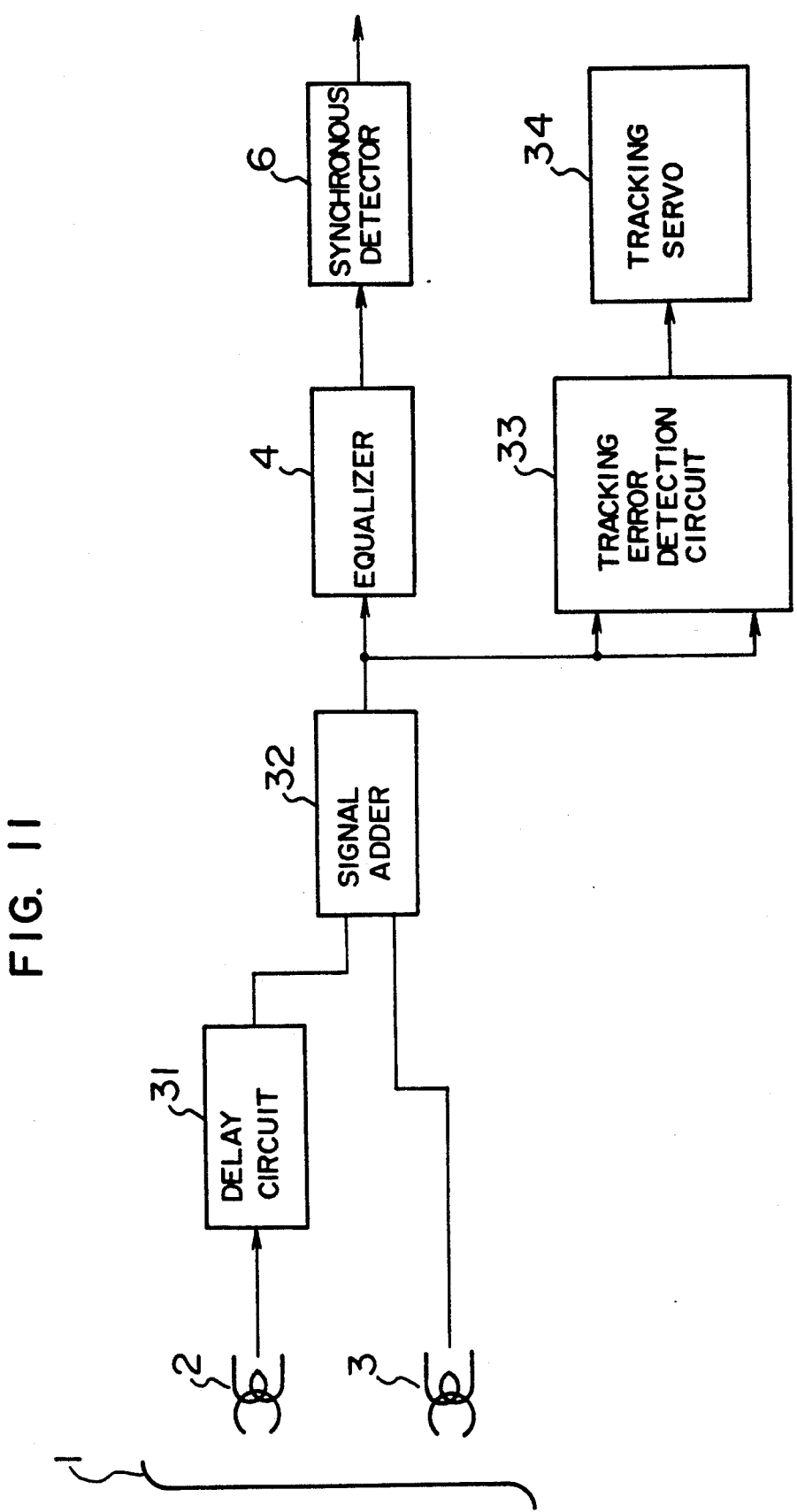
FIG. 11 shows a configuration of tracking error detection when an output of a signal adder in the third embodiment of the present invention is used as a tracking error signal.

FIG. 11 shows a block diagram of a principal portion of the magnetic recording and reproducing apparatus in accordance with the modification 3-1. The like elements to those of the first and third embodiments of the present invention are designated by the like numerals.

The modification 3-1 is identical to the third embodiment of the present invention except for the configuration of the tracking error detection, which is explained below.

The magnetic tape 1 has recorded thereon single-low frequency tracking pilot signals having different frequencies f1, f2 and f3 for the track 1, 2 and 3, respectively, which are frequency-multiplexed to the digital signal which is a primary signal. The multi-structure magnetic heads 2 and 3 have the same azimuth angle and reproduce the same track (track 2 in FIG. 5) with an overlap equal to one track pitch.

Turning back to FIG. 11, the reproduced signal of the magnetic head 2 is delayed by the delay circuit 31 to correct the time axes of the reproduced signals of the multi-structure magnetic heads 2 and 3 into the same time axis. The signal adder 32 adds the output of the delay circuit 32 and the output of the magnetic head 3, which have the same time axis, and supplies a sum output to the tracking error detection circuit 33.

Unlike the third embodiment, the output of the signal adder 32 is applied to the tracking error detection circuit 33.

The tracking error detection circuit 33 is of the same configuration as that shown in FIG. 6. The pilot amplitude detector 121 limits a band for the output of the signal adder 32, detects the amplitude level of the tracking pilot signal (f1) reproduced from the track 1 as the adjacent crosstalk, and supplies it to the level comparator 123.

Similarly, the pilot amplitude detector 122 limits a band for the output of the signal adder 32, detects the amplitude level of the tracking pilot signal (f3) reproduced from the track 3 as the adjacent crosstalk, and supplies it to the level comparator 123, which compares the outputs of the pilot amplitude detectors 121 and 122 to detect the tracking error.

In the modification 3-1, the multi-structure magnetic heads 2 and 3 have the same azimuth angle as shown in FIG. 5 and are arranged to trace the same track (track 2 in FIG. 5) with the overlap of one track pitch, and the reproduced signals of the magnetic heads 2 and 3 are added with the equal time axis and the tracking error is detected from the sum signal. Accordingly, if the tracking error occurs, for example, if the magnetic head is shifted toward the track 1 in FIG. 5, the tracking pilot signal (f1) recorded on the track 1 is reproduced by the magnetic heads 2 and 3 as the adjacent crosstalk which has a larger signal amplitude than that reproduced by one magnetic head. On the other hand, the tracking pilot signal (f3) recorded on the track 3 is reproduced by only the magnetic head 3 as the adjacent crosstalk, which has the same signal amplitude as that reproduced by one magnetic head. Accordingly, the error signal produced by the tracking error detection circuit 33 changes more greatly than it does when one magnetic head is used. Conversely, if the tracking is shifted toward the track 3 in FIG. 5, the tracking pilot signal (f3) recorded on the track 3 is reproduced by the magnetic heads 2 and 3 as the adjacent crosstalk which has a larger amplitude level than that reproduced by one magnetic head. On the other hand, the tracking pilot signal (f1) recorded on the track 1 is reproduced by only the magnetic head 2 as the adjacent crosstalk which has the same amplitude level as that reproduced by one magnetic head. Accordingly, the error signal produced by the tracking error detection circuit 33 changes more largely than it does when one magnetic head is used.

Accordingly, by detecting the tracking error from the output signal of the signal adder 32, the sensitivity characteristic of the tracking error detection can be made more abrupt than the prior art and the accuracy of tracking error detection is improved.

Figure 12:
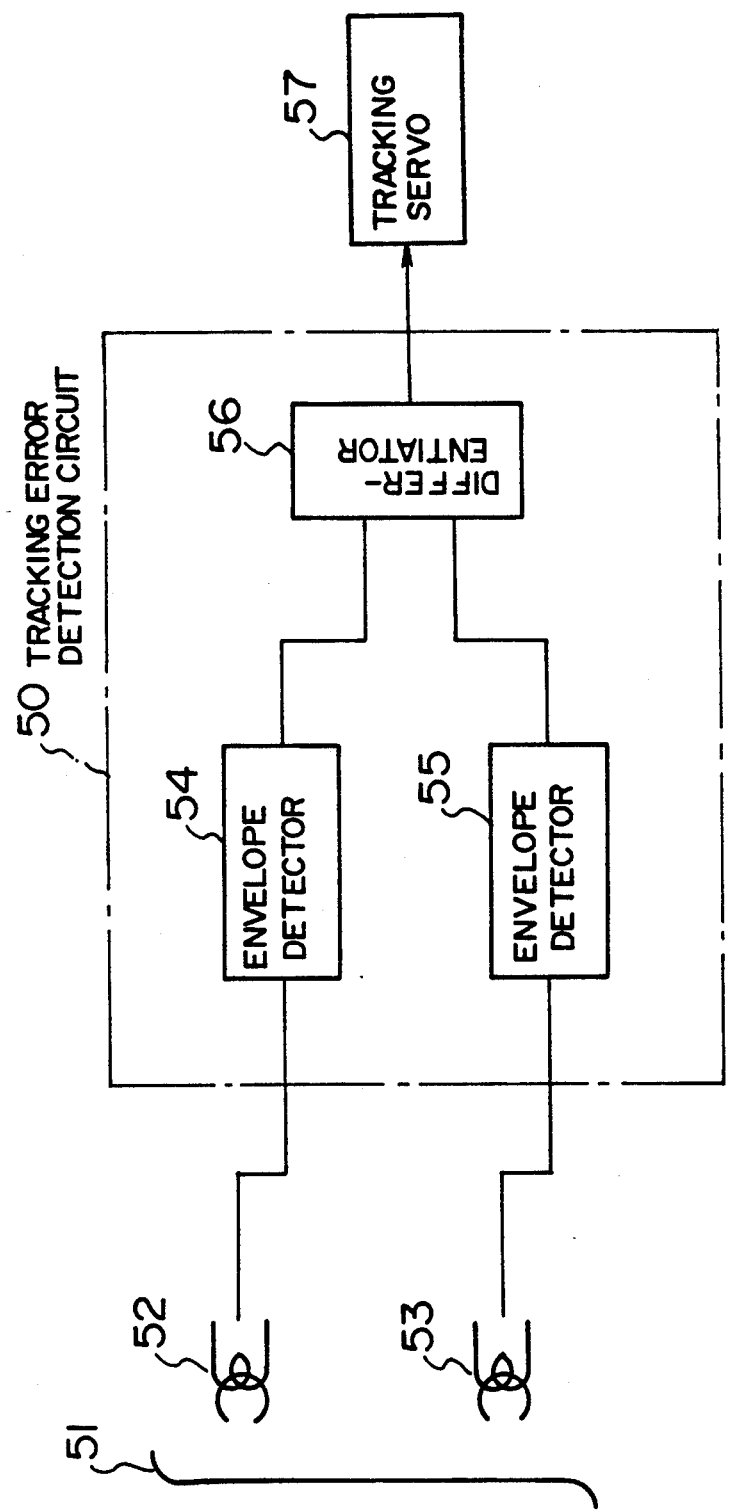
FIG. 12 shows a tracking error detector in a fourth embodiment of the magnetic recording and reproducing apparatus of the present invention.

FIG. 12 shows a tracking error detection circuit 50 in a fourth embodiment of the magnetic recording and reproducing apparatus of the present invention.

Numeral 51 denotes a magnetic tape on which signals are recorded. Numerals 52 and 53 denote magnetic heads for reproducing the signals recorded on the magnetic tape 51.

Figure 13:
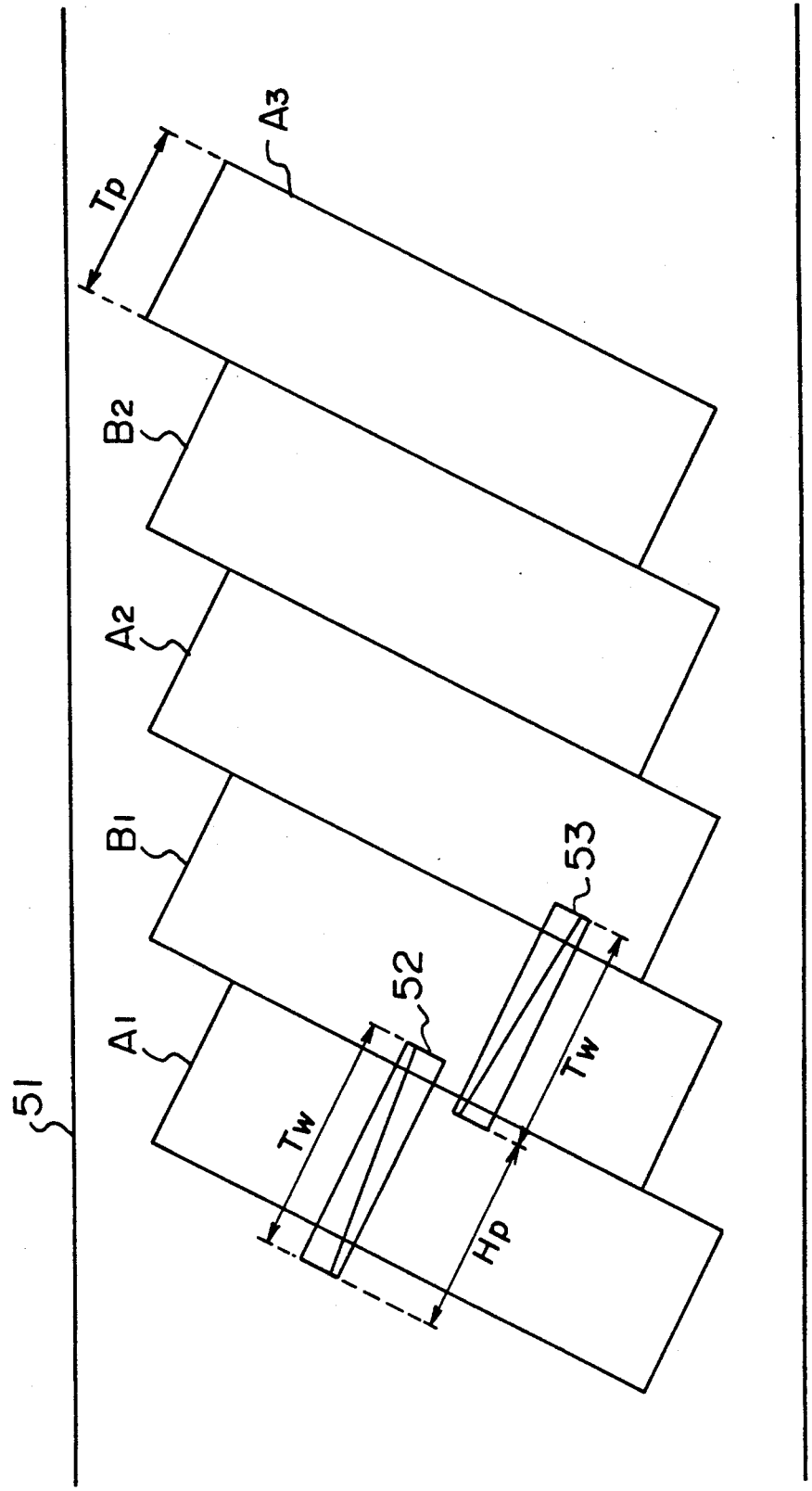
FIG. 13 shows an arrangement of record tracks on a magnetic tape and multi-structure magnetic heads in the fourth embodiment of the present invention.

The magnetic tape 51 and the magnetic heads 52 and 53 are arranged as shown in FIG. 13. Tp denotes a record track pitch, and Tw denotes a head width of the magnetic heads 52 and 53. In the present embodiment, Tw is equal to 1.5 Tp.

Record tracks A1, A2, A3, ... have signals recorded thereon by a magnetic head having the same azimuth angle as the magnetic head 52, and record tracks B1, B2, ... have signals recorded thereon by a magnetic head having the same azimuth angle as the magnetic head 53.

The magnetic heads 52 and 53 are arranged to reproduce from two adjacent record tracks substantially simultaneously. However, in order to detect the tracking error from the reproduced signals of the magnetic heads 52 and 53, the magnetic heads 52 and 53 are arranged such that the head-to-head interval Hp is not equal to the track pitch (Hp=1.25 Tp in the present embodiment.)

In FIG. 12, envelope detectors 54 and 55 detect reproduced signal levels of the magnetic heads 52 and 53, respectively. The output of the envelope detectors 54 and 55 are supplied to a differentiator 56, which detects a difference between the outputs of the envelope detectors 54 and 55 to produce the tracking error signal. A tracking servo 57 executes the tracking control to render the tracking error signal to zero.

Figure 14:
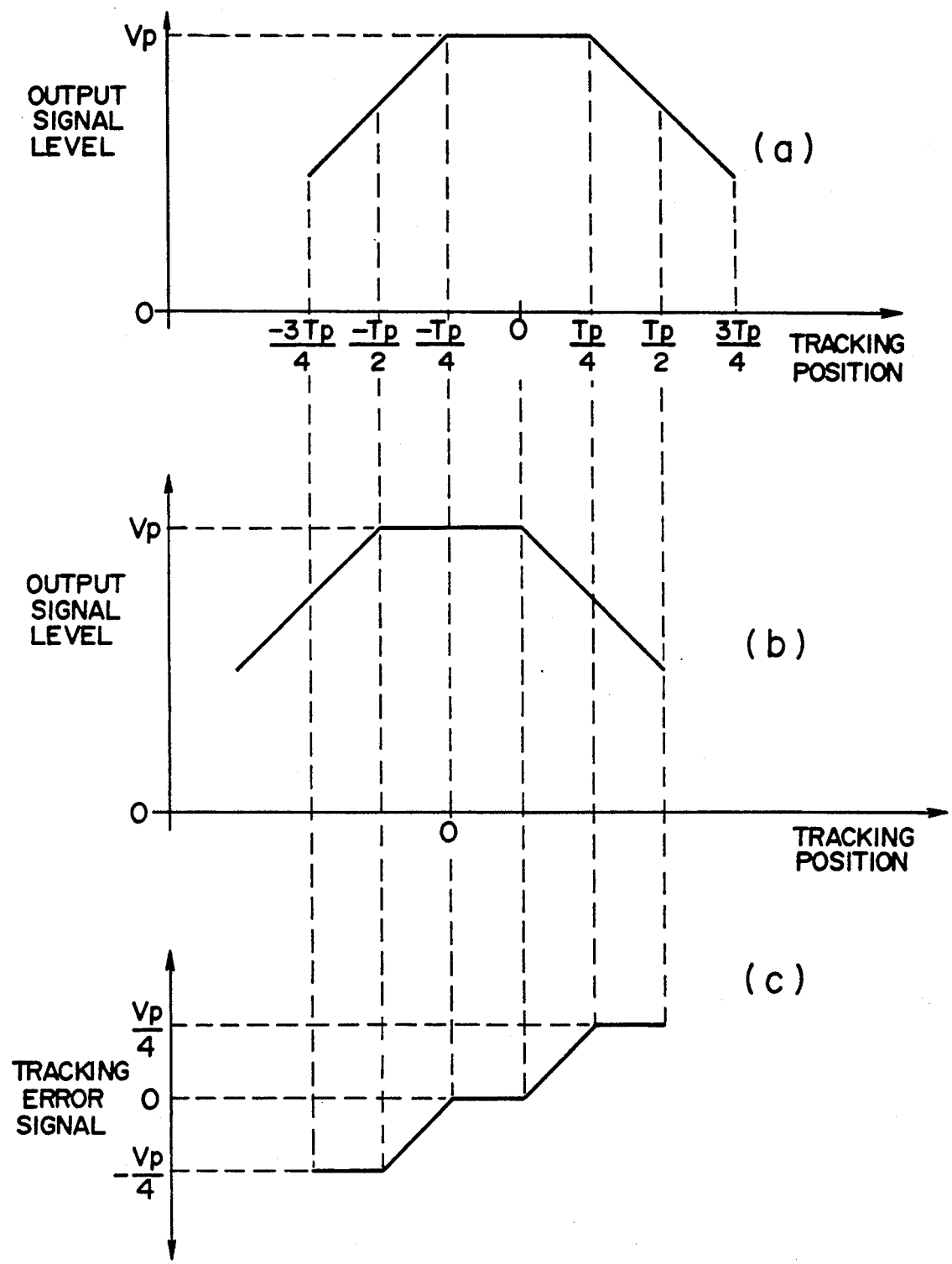
FIG. 14 shows a relationship between a tracking position and a tracking error signal in the fourth embodiment of the present invention.

An operation of the tracking error detection is explained with reference to FIG. 14.

FIG. 14(a) shows an output signal level of the signal reproduced from the record track A1 for the tracking position of the magnetic head 52 and detected by the envelope detector 54. Since the head width Tw is equal to 1.5 Tp, the magnetic head 52 is in a completely on-track state for the track A1 between $-Tp/4$ and $+Tp/4$ and produces a voltage Vp. When the tracking is shifted by $\pm 3Tp/4$, the on-track factor is 50%. FIG. 14(b) shows an output signal level reproduced from the record track B1 for the tracking position of the magnetic head 3 and detected by the envelope detector 55. The output level for the tracking shift is same as that of FIG. 14(a), but since the head-to-head interval of the magnetic heads 52 and 53 is equal to 1.25 Tp, the tracking shift comparing with that of the magnetic head 52 is equal to Tp/4.

FIG. 14(c) shows a tracking error signal generated by subtracting the signals of FIGS. 14(a) and 14(b) by the differentiator 56. When the tracking shift of the magnetic head 52 is between 0 and −Tp/4, the magnetic heads 52 and 53 are complete on-track for the tracks A1 and B1, respectively, and the tracking error signal is zero. When the tracking shift of the magnetic head 52 is between −Tp/4 and −Tp/2 and between 0 and Tp/4, the sensitivity of the tracking error signal for the tracking shift is equal to Vp/Tp and the tracking error signal is produced. When the tracking shift of the magnetic head 52 is between −Tp/2 and −3Tp/4, the tracking error signal of −Vp/4 is produced, and when the tracking shift is between Tp/4 and Tp/2, the tracking error signal of Vp/4 is produced.

The tracking control is effected by the tracking servo 57 to render the tracking error signal to zero by using the tracking error signal, and highly accurate tracking including the control of the linearity of the record track (track curvature) is attained. In addition, since the tracking pilot signals which are frequency-multiplexed to the primary signal are not used, there is no risk of disturbance to the principal signal.

Compared to the first, second and third embodiments, only one magnetic head is required to reproduce one track.

In the present embodiment as well as the first, second and third embodiments, the two multi-structure magnetic heads are used, although the number of the multi-structure magnetic head may be N (N is an integer which is not smaller than 2). In this case, further improvement is expected.

While not specifically mentioned in the first, second, third and fourth embodiments, since the multi-structure magnetic heads are used and the tracking is phase-controlled to realize the condition shown in FIG. 3, a function to record reproduced data, for example, an after-recording function of an audio signal, and an insert function of a control signal (viss or bass) can be readily attained.

In the modification 1-4 of the first embodiment, the tracking pilot signal is detected to prevent the reverse azimuth reproduction. Alternatively, by including the information representing the normal track position as well as the address information representing the signal position in the ID data of the signal data, the tracking servo may be controlled to trace the normal track by detecting the ID data.

When the reverse azimuth track is reproduced, the signal reproduced by the magnetic head is of lower level than that reproduced from the normal track because of an azimuth loss. Accordingly, the tracking servo may be controlled to trace the normal track by detecting a difference between the reproduced amplitude levels.

In the fourth embodiment, the tracking error detection circuit is constructed for the head-to-head interval of the magnetic heads equal to 1.25 Tp and the head width of the magnetic head equal to 1.5 Tp, although the head width may be other than 1.5 Tp or the head widths of the two magnetic heads are not equal, so long as the head widths of the two magnetic heads are not equal to the record track pitch Tp.

We claim:

1. A magnetic recording and reproducing apparatus for recording and reproducing digital signals on oblique tracks of a magnetic tape having different aximuth angles for juxtaposed tracks, said digital signals including a synchronization block having a synchronization pattern, ID data, signal data and error correction code data, said apparatus comprising:

(a) a magnetic head unit comprising (i) a first magnetic head, having an aximuth angle identical to an azimuth angle of a track of said magnetic tape to be reproduced, for reproducing said digital signals from said track and outputting a first reproduced signal, (ii) a second magnetic head, having an azimuth angle identical to said aximuth angle of said first magnetic head, for reproducing said digital signals from said track and outputting a second reproduced signal, said first and second magnetic heads being disposed so as to have an overlapping region with respect to a transverse direction of said track;

(b) a first equalizer, receiving said first reproduced signal, for correcting frequency characteristics of said first signal and outputting a first corrected signal and a first reproducing clock signal;

(c) a second equalizer, receiving said second reproduced signal, for correcting frequency characteristics of said second signal and outputting a second corrected signal and a second reproducing clock signal;

(d) a first synchronous detector, receiving said first corrected signal, for detecting said synchronization patterns and said ID data from said first corrected signal and outputting a first detected ID data signal;

(e) a second synchronous detector, receiving said second corrected signal, for detecting said synchronization patterns and said ID data from said second corrected signal and outputting a second detected ID data signal;

(f) a first error detection circuit, receiving said first detected ID data signal, for detecting a number of errors in each synchronization block of said first corrected signal and outputting a first error number signal indicative of said number of errors in each synchronization block of said first corrected signal and outputting said first corrected signal when said errors are detected;

(g) a second error detection circuit, receiving said second detected ID data signal, for detecting a number of errors in each synchronization block of said second corrected signal and outputting a second error number signal indicative of said number of errors in each synchronization block of said second corrected signal and outputting said second corrected signal when said errors are detected;

(h) a comparator, receiving said first and second error number signals, for comparing said first error number signal to said second error number signal and outputting a designation signal indicative of said error number signal having a lower error number;

(i) a selector, receiving said designation signal and said first and second corrected signals, for selectively passing therethrough one of said corrected signals in accordance with said designation signal; and (j) a tracking servo circuit, receiving said first and second reproduced signals from said first and second magnetic heads respectively, for controlling tracking of said magnetic head unit so as to maintain a center of said magnetic head unit in a predetermined relationship with respect to a center of said track, in accordance with said first and second reproduced signals.

2. The magnetic recording and reproducing apparatus according to claim 1, wherein said tracking servo circuit includes a tracking error detection circuit for detecting amplitude levels of said first and second reproduced signals and detecting a tracking error in accordance with a difference between said amplitude levels of said first and second reproduced signals.

3. The magnetic recording and reproducing apparatus according to claim 1, wherein said magnetic tape includes pilot signals having different frequencies provided in secondary tracks adjacent to said recording track and in tertiary tracks adjacent to said secondary tracks, said magnetic head unit records primary signals in a recording track with one of said pilot signals, and said tracking servo circuit includes:

(i) a first pilot detection circuit, receiving said first reproduced signal, for detecting an amplitude level of a pilot signal in said first reproduced signal and outputting a first pilot level signal, (ii) a second pilot detection circuit, receiving said second reproduced signal, for detecting an amplitude level of a pilot signal in said second reproduced signal and outputting a second pilot level signal, and (iii) a level comparator, receiving said first and second pilot level signals, for detecting a tracking error in accordance with a difference between said first and second pilot level signals.

4. A magnetic recording and reproducing apparatus for recording and reproducing digital signals on oblique tracks of a magnetic tape having different azimuth angles for juxtaposed tracks, said digital signals including an audio signals, an edit gap and a video signal, said apparatus comprising:

(a) a magnetic head unit comprising (i) a first magnetic head, having an azimuth angle identical to an azimuth angle of a track of said magnetic tape to be reproduced, for reproducing said digital signals from said track and outputting a first reproduced signal, (ii) a second magnetic head, having an azimuth angle identical to said azimuth angle of said first magnetic head, for reproducing said digital signals from said track and outputting a second reproduced signal, said second reproduced signal being delayed with respect to said first reproduced signal by a period t, said first and second magnetic heads being disposed so as to have an overlapping region with respect to a transverse direction of said track;

(b) a delay circuit, receiving said first reproduced signal, for delaying said first reproduced signal by a period t and outputting a first delayed reproduced signal which is in phase with said second reproduced signal;

(c) a comparator, receiving said first delayed reproduced signal and said second reproduced signal, for comparing amplitude levels between said first delayed reproduced signal and said second reproduced signal and outputting a comparison signal;

(d) a selector, receiving said first delayed reproduced signal, said second reproduced signal, said comparison signal and a synchronization signal, for selectively passing therethrough an output comprising one of (i) said first delayed reproduced signal and (ii) said second reproduced signal having a larger amplitude level in accordance with said comparison signal and said synchronization signal;

(e) an equalizer circuit, receiving said output from said selector, for correcting frequency characteristics of said output from said selector and providing an output;

(f) a synchronous detector, receiving said output from said equalizer circuit, for detecting a duration of said edit gap in said one of said first delayed reproduced signal and said second reproduced signal and outputting said synchronization signal, said synchronization signal representing said duration of said edit gap; and (g) a tracking servo circuit, receiving said first delayed reproduced signal and said second reproduced signal, for controlling tracking of said magnetic head unit so as to maintain a center of said magnetic head unit in a predetermined relationship with respect to a center of said track, in accordance with said first delayed reproduced signal and said second reproduced signal.

* * * * *